United States Patent [19]
Patterson

[11] Patent Number: 4,824,197
[45] Date of Patent: Apr. 25, 1989

[54] STAMPED PRECISION LIGHTGUIDE INTERCONNECT CENTERING ELEMENT

[75] Inventor: Richard A. Patterson, Georgetown, Tex.

[73] Assignee: Minnesota Mining and Manufacturing Company, St. Paul, Minn.

[21] Appl. No.: 182,872

[22] Filed: Apr. 18, 1988

[51] Int. Cl.⁴ .............................................. G02B 6/36
[52] U.S. Cl. .............................. 350/96.21; 350/96.20
[58] Field of Search ................. 350/96.20, 96.21, 96.22

[56] References Cited

U.S. PATENT DOCUMENTS

| | | | |
|---|---|---|---|
| 4,029,390 | 6/1987 | Chinnock et al. | 350/96.20 |
| 4,274,708 | 6/1981 | Cocito et al. | 350/96.21 |
| 4,339,172 | 7/1982 | Leather | 350/96.21 |
| 4,353,620 | 10/1982 | Schultz | 350/96.21 |
| 4,368,949 | 1/1983 | Schmidt | 350/96.21 |
| 4,391,478 | 7/1983 | Melman et al. | 350/96.20 |
| 4,435,038 | 3/1984 | Soes et al. | 350/96.21 |
| 4,593,971 | 6/1986 | Clement et al. | 350/96.20 |
| 4,729,619 | 3/1988 | Blomgren | 350/96.21 |

FOREIGN PATENT DOCUMENTS 1556476 11/1979 United Kingdom .

OTHER PUBLICATIONS

Tom Ormond, Technology News, EDN, Aug. 20, 1980, pp. 35, 36, 38, 40 and 41.
Larry Stauffer, Machine Design, Jan. 7, 1988, pp. 111, 112, and 113.

*Primary Examiner*—William L. Sikes
*Assistant Examiner*—Akm E. Ullah

[57] ABSTRACT

Elements for making butt splices in optical fibers are simplified when formed of a deformable material and formed to define three surfaces for contacting the fibers to be spliced. The surfaces are formed between two legs of an element such that when the legs are closed onto the fibers the surfaces center the fibers and afford a resilient spring compression reserve force on the aligned fibers to maintain them in contact and the fibers are depressed into the surfaces slightly to center the fiber cores.

20 Claims, 3 Drawing Sheets

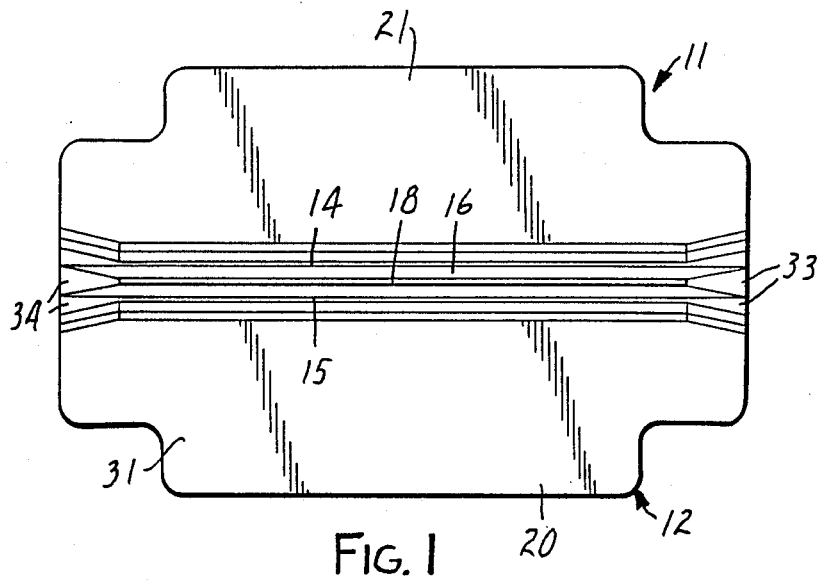
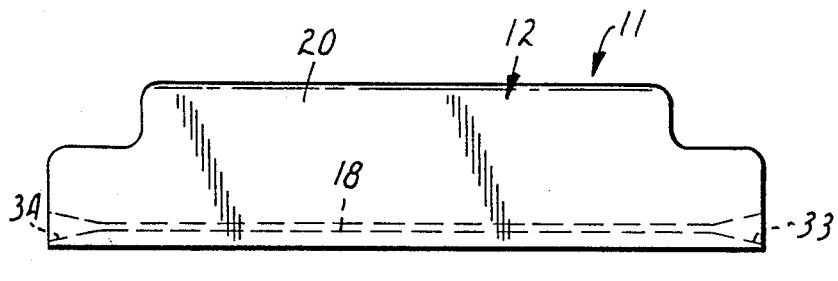
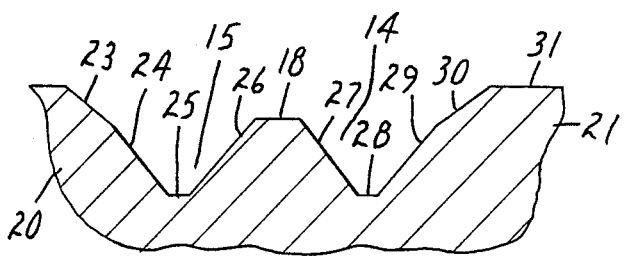
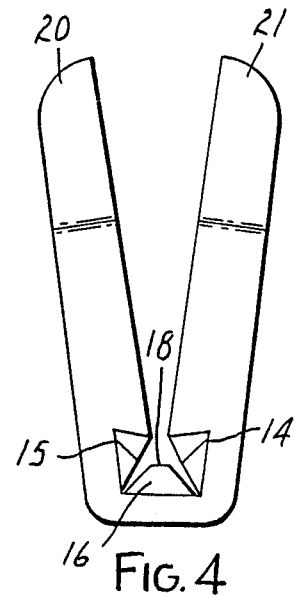

STAMPED PRECISION LIGHTGUIDE INTERCONNECT CENTERING ELEMENT

BACKGROUND OF THE INVENTION

1. Field of the Invention

This invention relates to optical fiber splicing elements and in one aspect to an improved optical fiber centering and holding device to afford the splicing of and alignment of ends of optical fibers.

2. Description of the Prior Art

The art is becoming replete with devices for centering optical fibers for the purpose of aligning ends of optical fibers for splicing the ends of fibers for continued transmission of light rays along the fibers. The optical fiber used in the telecommunications industry is mostly a single mode glass fiber. This fiber typically contains a 8 $\mu m \pm 1$ $\mu m$ diameter central glass core through which the optical signal is transmitted. The core is surrounded by a glass cladding which has a diameter of 125 $\mu m \pm 3$ $\mu m$. The cladding has a slightly different index of refraction than the core.

There are a number of prior art devices which have been designed to make permanent connections or splices in single mode glass fiber. To function properly and produce a low loss splice, these devices must align the core portions of the two fiber ends being spliced to within approximately 10% of their core diameter or less than 1 $\mu m$.

Some of the prior art devices attempt to achieve fiber end centering and alignment by forcing the fibers into a non-conformable "V" groove or between non-conformable rods. These devices function satisfactorily as long as the fibers being spliced are the same diameter. Examples of such devices are disclosed in U.S. Pat. Nos. 4,029,390; 4,274,708; and 4,729,619.

When the fibers to be spliced have diameters at opposite ends of the tolerance range (122 $\mu m$ and 128 $\mu m$), the non conformable "V" groove type devices have difficulty providing the required core alignment precision.

Other prior art devices urge the two fiber center lines into alignment with one another by locating the fiber ends between three equally spaced ductile or elastomeric surfaces. These surfaces create an equilateral triangular cross-sectional channel into which the fibers are positioned. The junction between the fiber ends is located usually at the mid point of the channel. These devices provide better performance than the non-conformable "V" groove type devices because they are better able to accommodate differences in fiber diameters. Examples of these devices are found in U.S. Pat. Nos. 4,391,487; 4,435,038; and 4,593,971.

Another prior art patent is U.S. Pat. No. 4,339,172 which utilizes a foldable grip member that is placed within an elastomeric sleeve which affords compressive forces against the grip member to assert pressure on the grip member to grip each of the cables at a number of equally-spaced points around its periphery.

The device of the present invention utilizes three equally spaced contact surfaces which form a fiber centering channel as do other prior art devices, but the device contains easily definable functional and performance improvements over the prior art. These differences in structure and means of operation are discussed below.

The splicing element of the present invention provides high precision movable fiber contact surfaces and integral actuation structure affording such movement in a single easy to manufacture part. The fiber clamping surfaces are initially spaced far enough apart to allow fibers to be easily inserted into a channel or passageway until the end faces are in contact. This structure makes it easy to detect b tactile feedback and/or buckling in the opposing fiber when the first fiber is pushed against the opposing fiber in the passageway. When the fiber ends are in contact, the splice element is closed and the fiber ends are aligned and clamped. Other prior art devices such as the device of U.S. Pat. No. 4,391,487 and the commercial form sold by the assignee of U.S. Pat. No. 4,391,487 utilizes molded elastomer blocks for centering and aligning the fiber. These blocks contain an essentially triangular cross-sectional passageway which is slightly smaller than the diameter of the fibers. When the fibers are inserted into the molded passageway, they are required to force the elastomer surfaces open by elastically deforming the elastomer contact surfaces. This requires significant compressive force on the fiber to push it into the passageway. Because of this high insertion force, it is often difficult to tell when the fiber end faces are actually in contact inside the splice. Additionally, it is possible to easily break the fibers under compressive buckling as they are forced into the elastomeric centering blocks.

Only very small ductile or elastic deformation of the fiber locating surfaces is required in the splice element of the present invention to provide precise fiber centering and clamping. This deformation creates no external material flow parallel to the axis of the fiber and produces no ductile deformation of the hinged structure around the clamping surfaces. Other prior art devices such as the connector of U.S. Pat. No. 4,435,038 require extremely large deformations of the fiber clamp surfaces and surrounding structure to produce fiber centering and clamping. Unfortunately, these large deformations may result in unwanted distortion of and unequal clamp forces on the fiber engaging surfaces. This in turn may also produce shifting of the fiber center lines and axial separation of the fiber end faces.

Forces high enough to embed the fiber uniformly into each of the clamping surfaces of the splicing element of the present invention by ductile deformation can be generated easily through the hinged lever structure afforded by the legs of the splicing element. Once clamped, the splicing element maintains uniform compressive loads on the fibers which result in high fiber tensile load retention, and excellent thermal cycling stability. The fiber clamp forces are maintained by elastic energy stored in the legs of the splicing element as well as in the clamping structure. Other prior art devices such as the connector of U.S. Pat. No. 4,435,038 tend to relax or elastically recover slightly after removal of the splice crimping tool forces. This relaxation may result in a slight loosening of the fiber in the locating channel which can lead to reduced pull out forces as well as fiber end face separation during thermal cycling.

During the fiber centering and splicing process in the splicing element of the present invention, clamping loads are generated on the fiber. Since glass has very high compressive strength, these loads tend to embed the fibers into the three ductile contact surfaces forming the fiber channel in the element. These clamping loads on the fiber cladding result in excellent tensile load retention capabilities and thermal cycling stability for the splice. In addition, the application of the clamping load is easily and quickly accomplished simply by squeezing together the legs of the splice element. Other prior art devices such as the fiber centering device of U.S. Pat. No. 4,391,487 require adhesives to bond the fiber to the external splice structure beyond the fiber centering blocks. These adhesives can be difficult and time consuming to apply and to cure uniformly.

The splicing element of the present invention has also been designed to permit reuse. If it becomes necessary to remove fibers from or reposition fibers within the splice, the clamping force provided on the legs of the element can be easily removed, and the elastic memory in the element legs and hinge sections will cause the fiber locating and clamping surfaces to move apart or reopen. The clamping loads on the fibers are then released, and the fibers can be withdrawn, rotated or repositioned. Other prior art devices such as the connectors of U.S. Pat. Nos. 4,391,487 and 4,435,038 are permanently crimped or adhesively bonded and cannot be reused.

SUMMARY OF THE INVENTION

The present invention provides a deformable splice element for use in butt splicing two optical fibers which element comprises a folded sheet formed in one surface with two parallel grooves having converging walls which define, therebetween, a rib having a land area recessed from the one surface. The other walls of the grooves are separated at their base portions from the converging walls by land areas along which the sheet is folded. The other walls extend from the land areas at which the sheet is folded to the one surface of the sheet in which the grooves are formed and define two additional fiber supporting surfaces which together with the land area of the rib form a passage for receiving an optical fiber after the sheet has been folded. The sheet has edge portions forming legs which diverge from each other and extend past the passageway. These legs can be drawn toward each other to reduce the size of the passageway by bringing the additional fiber supporting surfaces and the land area of the rib against circumferentially spaced areas of the optical fibers for aligning their axes and deformably clamping the ends of the fibers in the element.

The splicing element is preferably made of a deformable material, such as aluminum which is ductile at stress levels above 6 to 8 ksi, but elastic at lower stress levels to afford sufficient resilience in the hinge and leg portions of the element to maintain a continual compression force on the optical fibers once the legs have been brought together.

In a splice connector means are provided to urge the legs together and hold the same resiliently against the optical fibers. One such holding means may be an extended tab on one edge portion which is normally folded over the other edge portion for holding the two together after the ends of optical fibers are inserted into the passageway and the edge portions or legs are squeezed together.

The squeezing of the edge portions brings the land area of the rib and the additional fiber supporting areas against the optical fiber or more generally against the cladding on the optical fiber with sufficient force that the three surfaces are deformed by the fiber. Should the two fibers differ in outside diameter the deformation of the surfaces may vary due to the two sizes of fibers but the surfaces will be deformed by both fibers to align the axes of the two fibers.

BRIEF DESCRIPTION OF THE DRAWING

The present invention will be further described with reference to the accompanying drawing, wherein:

FIG. 1 is a plan view of the sheet forming the splice element;

FIG. 2 is an end view of the sheet of FIG. 1;

FIG. 3 is a side view of the splice element of the present invention;

FIG. 4 is an end view of the splice element ready to accept an optical fiber and formed by folding the sheet of FIG. 1;

FIG. 5 is an enlarged fragmentary cross-sectional view of the sheet of FIG. 1;

DESCRIPTION OF THE PREFERRED EMBODIMENT

Figure 6:
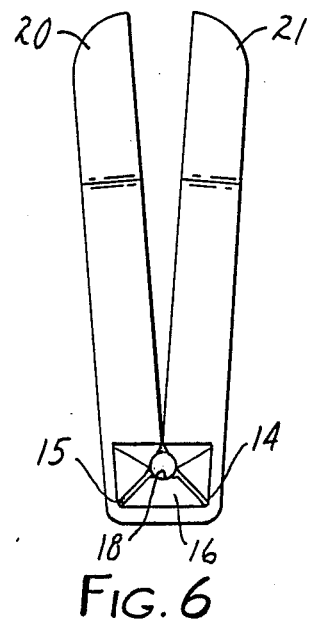
FIG. 6 is an end view of a splice element with an optical fiber disposed and clamped in the element.

The present invention will be described with reference to the accompanying drawing wherein FIGS. 1 through 6 illustrate the splice element generally designated 11 which is formed from a sheet 12 of ductile, deformable, elastic material. The sheet 12 has a pair of parallel grooves 14 and 15 formed generally centrally thereof which grooves define therebetween a rib 16 having an optical fiber supporting surface 18. The sheet 12 has edge portions 20 and 21 on either side of the grooves 14 and 15 which form legs that serve as means for drawing opposed surfaces on the sheet toward each other to align the axes of fibers positioned on the supporting surface 18 into compressive engagement therewith.

Referring now to FIG. 5 there is shown in enlarged scale the shape of the grooves 14 and 15. The sheet is stamped, coined or molded to provide preferably nine surfaces formed in the face or surface 31 of the sheet 12. The surface 23 is disposed at an angle of 55° to a vertical line or line perpendicular to the face of the sheet to form one optical fiber supporting surface, surface 24 is disposed at an angle of 42.5° to the vertical line and together with surface 23 form one wall of the groove 15. The base of the groove is defined by a land area 25 along which the sheet 12 is folded to bend side portion 20 near a surface 26 forming a wall of the groove 15 and one side of the rib 16. The rib 16 has the surface 18 defining a support surface and the other wall or surface defining the rib is surface 27. The base of the groove 14 has a land area 28 joined to wall 27 and a first part or surface 29, corresponding to surface 24, and surface 30 corresponding to surface 23, forming the other wall of groove 14. Surfaces 26 and 27 are disposed at an angle of 42.5° to the vertical line. The surface 18 is recessed from the surface 31 of the sheet 12 sufficiently that when the sheet 12 is folded at the land areas 25 and 28 to dispose the side portions or legs 20 and 21 at 15° to 20° apart, the surfaces 23, 18 and 30 will be disposed to form a passageway to accept the desired sized fiber easily and engage the surface of a cylindrical fiber placed within the passageway at locations approximately 120° apart. This is generally illustrated in FIG. 6. Surfaces 18, 23, 24, 25, 26, 27, 28, 29, and 30 may also be curved slightly transversely about an axis instead of being planes but straight longitudinally. The only restriction on the surface geometry is that the 3 contact surfaces 23, 18, and 30 produce a channel with contact points or lines spaced at approximately 120° intervals around the circumference of the fiber and engage the fibers substantially uniformly along the length of the fiber ends in the element.

The sheet 12 is provided with bevelled, flattened or flared surfaces 33 and 34 at opposite ends of the rib and side walls of the grooves 14 and 15. These flattened areas and 34 define funnel like entrance areas to guide a fiber into the passageway defined by the surfaces 23, 18 and 30 of the splice element. These surfaces 33 and 34 also afford means limiting the amount of bending on the fiber such that it cannot be bent initially more than 15° to 20° at the splice element after a splice is formed.

The sheet 12 is preferably formed of a metal, such as an aluminum sheet of 0.5 mm (0.020 inch) thick alloy 3003 with a temper of 0. The hardness of the material can be between 23 and 32 on the Brinnell scale (BHN) and the tensile yield strength can be between 35 to 115 MPa (Mega pascals) (5 to 17 ksi). Another alloy is 1100 with a temper of 0, H14 or H15, together with a tensile yield strength and a hardness within the ranges. Both alloys provide a material which is much softer than the glass of the optical fiber and the cladding but ductile under the clamping pressures applied to the optical fibers. Such deformation is sufficient that the surfaces 23, 18 and 30 conform to the optical fibers contacted and should one fiber be larger than another, the surfaces will deform sufficiently to clamp onto both fiber ends and be deformed even by the smallest of the two fibers. Thus, the splice element 11 will center the cores of the optical fibers such that in aligned position 90% or better of the surfaces of the core portions be aligned. The material of the sheet 12 is also resilient such that the elastic limit of the material in the hinge areas and lever means afforded by the side portions is not exceeded when the side portions are folded to contact and clamp a fiber therein. The elasticity of the material is such that the legs 20 and 21 will maintain a compressive force on the optical fiber after the splice is made to restrict the fibers from pulling out or the centers of the fibers from shifting from their position of alignment with each other. This continued spring compression also restricts any changes in the performance of the splice with changes in temperature. The reserve forces of this spring compression are always present when the splice has been completed.

The fibers are retained in the element such that the pull-out force will exceed the tensile strength of the glass fiber.

The splice element normally has a gel disposed in the area of the fiber receiving passageway which has index of refraction matching characteristics similar to the fiber core to improve the continuity of the transmission through the splice.

In a preferred example, the surface 18 has a width of 0.152 mm (0.0060 inch) and is recessed 0.109 mm (0.00433 inch) from the surface 31. From the center line through the rib 16 to the base of surfaces 26 or 27 is 0.317 mm (0.0125 inch), the width of surfaces 25 and 28 is 0.0838 mm (0.0033 inch). The distance from the center line through the rib 16 to the junction between surfaces 23 and 24 is 0.582 mm (0.0229 inch) and from the center line to the junction between surfaces 23 and 31 is 0.833 mm (0.0328 inch). The sheet 12 is normally 17.78 mm (0.7 inch) long by 7.62 mm (0.3 inch) wide along the major edges.

In tests, twenty sample elements were made using the geometry and dimensions defined above. Ten elements were made from 1100 series aluminum of 0 temper and ten samples were made in 1100 series aluminum of H15 temper. The same single mode fiber was used in making the splices in all sample elements. The average insertion loss for the H15 temper samples was approximately 0.10 db and for the 0 temper samples it was approximately 0.15 db. In thermal cycling tests where the elements were subjected to 78° C. for one hour, room temperature for one hour, one hour at −40° C., one hour back at room temperature, etc., showed a variation of less than 0.1 db loss over two weeks. Tests for insertion loss were made using a Hewlett Packard Model 8154B, 1300 $\mu$m LED source and a Hewlett Packard Model 8152A Optical Average Power Meter.

Figure 7:
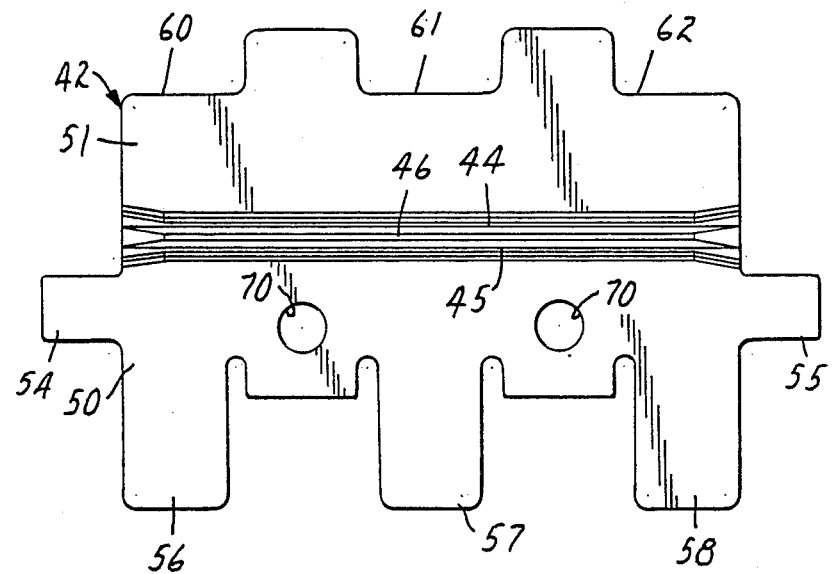
FIG. 7 is a plan view of a second embodiment of the sheet of FIG. 1.
Figure 8:
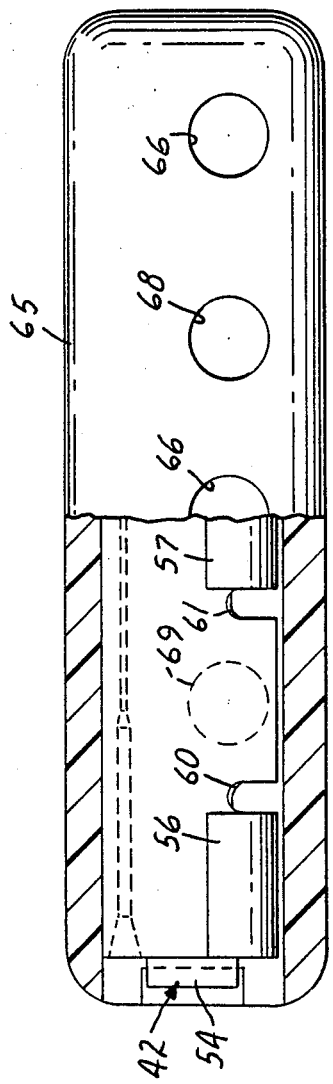
FIG. 8 is a plan view of a connector for making butt splices for optical fibers, partly in section to show interior portions.
Figure 9:
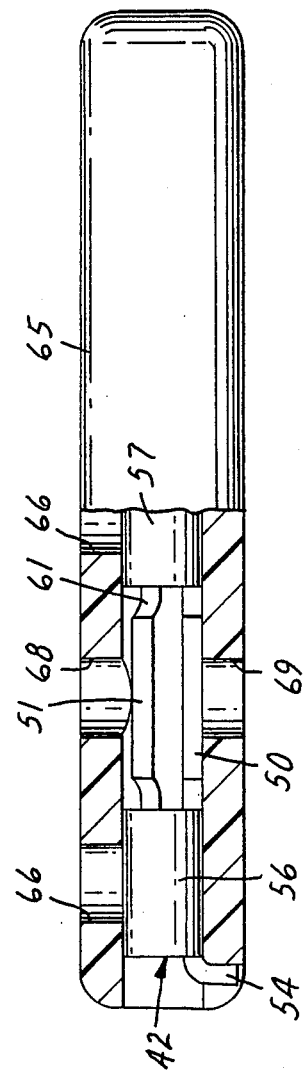
FIG. 9 is a front view of the splice connector of FIG. 8, partly in section to show interior portions.
Figure 10:
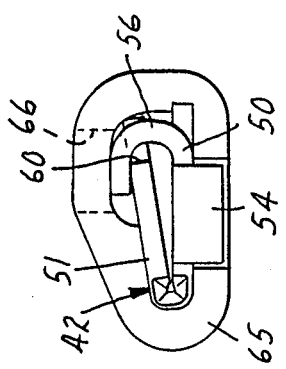
FIG. 10 is an end view of the connector of FIGS. 8 and 9.

FIG. 7 shows another embodiment of a sheet forming a splice element. In FIG. 7 the sheet 42 is formed generally to correspond to the sheet 12 in that it has two grooves 44 and 45, a rib 46 and side portions or legs 50 and 51. The outer profile of the sheet 42 differs from sheet 12 however in that the leg 50 has end tabs 54 and 55 and projecting edge flaps 56, 57 and 58 which are adapted to be bent over the leg 51 in the slotted areas 60, 61 and 62. The tabs 54 and 55 serve to hold the splice element 40 in place in a housing 65 for the splice element as seen in FIG. 10. The general size and dimensions of element 40 correspond to those of element 11.

The flaps 56, 57, and 58 are folded to positions over the leg 51 after the sheet 42 has been folded along the grooves 44 and 45. The splice element is then placed in a housing 65 from one end and the tabs 54 and 55 are folded to engage the ends of the housing. The housing 65 may be formed as an extrusion and then cut and drilled to form access openings 66 to permit a tool to engage the flaps 56, 57 and 58 to apply the clamping pressure onto the legs 50 and 51 and to further fold the flaps to maintain the legs in closed clamping position. The housing 65 may also be injection molded. Additional openings 68 in the housing permit a tool to engage the tongues on leg 51 between the slotted areas 60, 61 and 62 to make a temporary splice which can reopen due to the resilience of the element 42 and not deform the flaps 56, 57 and 58. After the flaps 56, 57 and 8 are deformed, it is still possible to reopen the splice element by introducing a tool through openings 69 in the housing (only one of which is shown) which openings are aligned with openings 70 in the leg 50. The openings allow pressure to be exerted by the tool against the leg 51 to separate it from the leg 50 and deform the flaps 56, 57 and 58 to release the clamping force on a pair of optical fibers. Because of the ductile deformation of the fiber contact surfaces of the deformable metal splice element, there will be a practical limit to the number of times the element can be reused. This limit will depend upon the fiber diameter difference encountered at each reuse along with the fiber end interface position along the fiber channel at each reuse.

Having disclosed a preferred embodiment of the splicing element and a modification thereof, it is to be understood that other modifications can be made without departing from the spirit or scope of the invention as defined in the appended claims.

I claim:

1. A splice element for use in butt splicing two optical fibers, said element being formed from a thin sheet of deformable material having opposite surfaces and a pair of parallel grooves formed in one surface, two of the walls defining said grooves form a rib having equal converging sides and a first fiber supporting surface therebetween, the other two side walls forming the grooves are separated at their base portions from said two of the walls by land areas at which said sheet is folded, and said other two side walls extend from said land areas to said one surface of said sheet and include surface areas defining two additional fiber supporting surfaces which are disposed in an angular relationship to each other and with said first fiber supporting surface of said rib which surfaces collectively define an optical fiber passageway larger than the dimensions of a fiber when said sheet is folded to receive and align two opposed fiber ends at the axis of said passageway, and the sides of said sheet parallel to said grooves form legs which diverge from each other with the sheet folded and serve to draw the supporting surfaces toward one another upon movement of the edges of the legs toward one another to engage two said fiber ends and clamp them in axially aligned position.

2. A splice element according to claim 1 wherein said sheet is formed of a material having sufficient elastic yield strength to permit the legs to clamp said surfaces against two said fiber ends to embed two said fiber ends into said fiber supporting surfaces.

3. A splice element according to claim 2 wherein said material is metal.

4. A splice element according to claim 3 wherein said metal is an aluminum alloy having an elastic yield strength of between 35 and 115 MPa.

5. A splice element according to claim 1 wherein said support surface on the rib is recessed from said one surface.

6. A splice element according to claim 1 wherein said sheet is generally rectangular and said rib is formed generally centrally of said sheet and extends longitudinally of said sheet and parallel to the longitudinal edges of said sheet.

7. The splice element according to claim 1 wherein said sheet is provided with bevelled surfaces at opposite ends of said rib and groove side walls to define funnel like entrance areas into said fiber locating passageway.

8. A splice element according to claim 2 wherein said sheet is formed of aluminum and the sheet is about 0.57 mm thick.

9. A splice element according to claim 8 wherein said aluminum sheet is aluminum alloy 3003.

10. A splice element according to claim 9 wherein said aluminum has a 0 temper.

11. A splice element according to claim 8 wherein said aluminum is alloy 1100 having 0 temper.

12. A splice element according to claim 8 wherein said aluminum has a temper of about H14 and H15.

13. A splice element according to claim 12 wherein said aluminum sheet is alloy 1100.

14. A splice element according to claim 8 wherein said aluminum is an alloy of 0 temper.

15. A splice element according to claim 1 wherein said sheet has flaps projecting from one side edge of one leg which flaps are folded over the side edge of the other leg.

16. A splice element according to claim 5 wherein said supporting surfaces are positioned at an angle of about 60° to each other with said sheet folded along opposite sides of said rib.

17. A splice element according to claim 1 wherein said supporting surfaces are initially planar and said deformable material becomes ductile at the supporting surfaces when the legs are forced toward each other to embed the optical fibers into said supporting surfaces.

18. A stamped precision lightguide interconnect centering element for use in butt splicing two optical fibers, said element being formed from a thin generally rectangular sheet of deformable metal having opposite surfaces and longitudinal edges, means defining three elongate optical fiber supporting surfaces including a generally centrally disposed surface and two side surfaces which are angularly positioned with respect to each other when said sheet is folded along opposite longitudinal edges of said centrally disposed surface, said supporting surfaces collectively define an optical fiber passageway larger than the dimensions of a fiber to receive and align two opposed fiber ends at the axis of said passageway, and the edges of said sheet parallel to said supporting surfaces form lever means supporting said two side surfaces for moving the supporting surfaces toward one another upon movement of the lever means toward one another to engage two said fiber ends and clamp them in axially aligned position, said metal having sufficient elastic yield strength to permit said lever means to clamp said surfaces against said fiber ends to embed said fiber ends into said fiber supporting surfaces.

19. An element according to claim 18 wherein said metal is an aluminum alloy having an elastic yield strength of between 35 and 115 MPa.

20. An element according to claim 16 wherein said aluminum has a temper of one of 0, H14 and H15.

* * * * *